No. 878,143. PATENTED FEB. 4, 1908.
J. W. KOCH.
COMBINED NUT LOCK AND ANTIRATTLER.
APPLICATION FILED JULY 23, 1907.
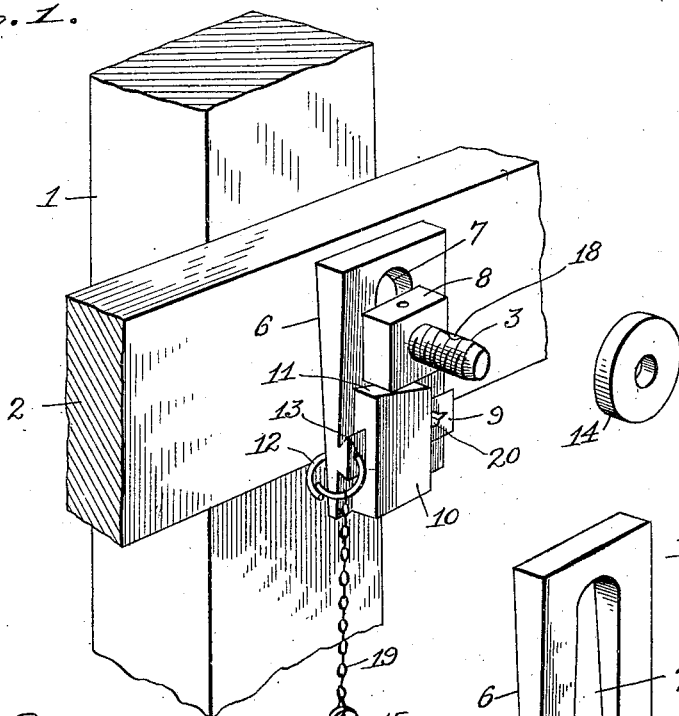
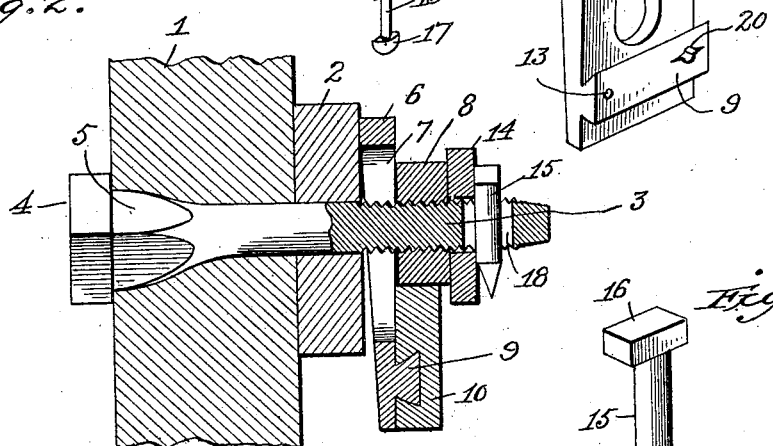
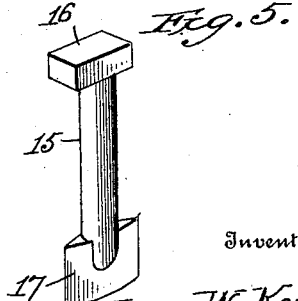
Witnesses
Edwin F. Frey
Percy B. Holk
Inventor
James W. Koch
By Edwin L. Jewell
his Attorney

UNITED STATES PATENT OFFICE.

JAMES W. KOCH, OF TAMAQUA, PENNSYLVANIA.

COMBINED NUT-LOCK AND ANTIRATTLER.

No. 878,143. Specification of Letters Patent. Patented Feb. 4, 1908.

Application filed July 23, 1907. Serial No. 385,116.

*To all whom it may concern:*

Be it known that I, JAMES W. KOCH, a citizen of the United States, residing at Tamaqua, in the county of Schuylkill and State of Pennsylvania, have invented certain new and useful Improvements in a Combined Nut-Lock and Antirattler, of which the following is a specification.

My invention relates to combined nut locks and antirattlers, and has for its primary object to provide a novel construction of the same embodying a wedge having a removable weight thereon that acts also as a lock for the nut.

My invention also embodies certain other novel features, as will be hereinafter pointed out and claimed, reference being had to the accompanying drawing, in which Figure 1 is a perspective view of my improved construction, the key being removed from position, and the washer being shown detached. Fig. 2 is a vertical sectional view of the same. Fig. 3 is a detail perspective view of the wedge plate. Fig. 4 is a detail sectional view of the end of the bolt. Fig. 5 is an enlarged perspective view of a modified form of the key.

Similar numerals of reference denote corresponding parts in the several views.

In the said drawing the reference numerals 1 and 2 denote the two members to be connected, and 3 the threaded bolt connecting the same, said bolt having the headed end 4 and preferably an enlarged angular portion 5 adjacent said head to prevent said bolt from turning.

With the parts in position there is located on said bolt next to member 2, a wedge plate 6, apertured longitudinally at 7 to receive the bolt end and yet permit a vertical adjustment of said wedge plate thereon. Contacting with said wedge plate is a nut 8 screwed onto the bolt 3, as shown. Formed on the lower end of said wedge plate 6 is a horizontally disposed key-way 9, adapted to receive a locking piece or weight 10 that is slotted on one face to correspond with said key-way. With the wedge plate and nut in position, the locking piece or weight is slid onto the key-way 9 until its upper inclined face 11 contacts with the lower face of nut 8 and wedges thereagainst, said locking piece or weight thus performing the two-fold function of a lock for said nut, and of a weight for said wedge-plate to retain the latter in position. In order to prevent the accidental withdrawal of said locking piece or weight I provide a spring-ring 12, which is passed through an aperture 13 in the wedge-plate, and locks said locking piece or weight in position.

When it is desired to employ a washer 14 on said bolt I lock the same in position by means of a key 15 having a circular body portion, a head 16 and a broadened but tapered point 17, which will pass through a similarly shaped aperture 18 in the bolt 3 and which may then be turned to have its head and point lie flat against said washer, as shown in Fig. 2. To insert said key, it is necessary to first move the wedge plate to its upward limit of movement and screw nut 8 further in, to give room for the point 17 of key 15 to enter aperture 18 in bolt 3 lengthwise. Then when the key 15 is turned to the position shown in Fig. 2, the nut 3 may be screwed out again to force washer 14 against key 15, the wedge plate 6 forced down, and the locking piece or weight 10 inserted in position, the whole combining to provide a securely locked device that will also serve as an anti-rattler, the weighted wedge plate 6 automatically accommodating itself to the space between member 2 and nut 8.

If desired I may connect spring ring 12 and key 15 by means of a chain 19 and may provide in the end of key-way 9 opposite the aperture 13 a slot 20 shaped to receive and retain the point 17 of key 15 when the same is not in use with a washer 14.

My improved device is particularly applicable to use where the members to be held together are subject to jars, such as vehicles of various sorts, the weighted wedge plate accommodating itself automatically to variations in the space between member 2 and nut 8.

Having thus described my invention, what I claim as new and desire to secure by Letters Patent, is:—

1. In combination, a threaded bolt, a nut thereon, a vertically adjustable apertured wedge plate between said bolt and the part through which said bolt passes, and a weight removably mounted on said wedge plate and adapted when positioned to contact with and lock said nut against rotation.

2. In combination, a threaded bolt, a nut thereon, a vertically adjustable apertured wedge plate between said nut and the part through which said bolt passes, and a weight sliding on said wedge plate and having its face adjacent to said nut angularly disposed to engage and wedge against said nut.

3. In combination, a threaded bolt, a nut thereon, a vertically adjustable apertured wedge plate between said nut and the part through which said nut passes, a weight sliding on said wedge plate and having its face adjacent to said nut angularly disposed to engage and wedge against said nut, a washer on said bolt outside of said nut, and a key having enlarged ends passing through an aperture in said bolt and locked thereon by turning.

In testimony whereof I affix my signature, in presence of two witnesses.

JAMES W. KOCH.

Witnesses:
SAMUEL R. BEARD,
JOHN J. KELLEY.